(12) United States Patent
Hsu

(10) Patent No.: US 7,867,602 B2
(45) Date of Patent: Jan. 11, 2011

(54) SCRATCH-RESISTANT OPTICAL FILM

(75) Inventor: Lung-Lin Hsu, Kaohsiung (TW)

(73) Assignee: Eternal Chemical Co., Ltd., Kaohsiung (TW)

( * ) Notice: Subject to any disclaimer, the term of this patent is extended or adjusted under 35 U.S.C. 154(b) by 313 days.

(21) Appl. No.: 12/004,088

(22) Filed: Dec. 19, 2007

(65) Prior Publication Data
US 2008/0151549 A1 Jun. 26, 2008

(30) Foreign Application Priority Data
Dec. 25, 2006 (TW) .............................. 95148801 A

(51) Int. Cl.
*B32B 5/16* (2006.01)
*G11B 5/64* (2006.01)
*D06N 7/04* (2006.01)

(52) U.S. Cl. ...................... 428/156; 428/141; 428/323; 428/327

(58) Field of Classification Search ................ 428/141, 428/156, 323, 327, 328, 329, 317.9, 409, 428/304.4
See application file for complete search history.

(56) References Cited

U.S. PATENT DOCUMENTS

| 6,005,017 | A | 12/1999 | Daly et al. |
| 6,319,594 | B1 * | 11/2001 | Suzuki et al. ............... 428/208 |
| 6,503,627 | B1 | 1/2003 | Niimi et al. |
| 6,906,761 | B2 * | 6/2005 | Nakano ........................ 349/65 |
| 7,037,573 | B2 * | 5/2006 | Miyatake et al. ......... 428/195.1 |
| 2003/0068466 | A1 | 4/2003 | Mimura et al. |
| 2006/0132922 | A1 | 6/2006 | Takao et al. |
| 2006/0167126 | A1 * | 7/2006 | Goto et al. ..................... 522/81 |
| 2008/0038561 | A1 | 2/2008 | Yoshizawa et al. |

FOREIGN PATENT DOCUMENTS

| TW | 576851 | 5/2001 |
| TW | 527507 | 4/2003 |
| TW | M286939 | 2/2006 |
| TW | 200639225 | 11/2006 |
| WO | WO 2004044063 A1 * | 5/2004 |

OTHER PUBLICATIONS

English abstract of TW 200639225 dated Nov. 16, 2006.
English abstract of TW 527507 dated Apr. 11, 2003.
Figure 2 of M286939 dated Feb. 1, 2006.
English abstract of TW 576851 dated May 11, 2001.

* cited by examiner

*Primary Examiner*—David R Sample
*Assistant Examiner*—Catherine Simone
(74) *Attorney, Agent, or Firm*—Ladas & Parry LLP

(57) ABSTRACT

The invention pertains to an optical film comprising a reflective substrate, characterized in that at least one of the surfaces of the substrate has a scratch-resistant layer which possesses anti-static properties, wherein the scratch-resistant layer has a surface resistivity in the range from $10^8$ to $10^{12}\Omega/\square$, and a pencil hardness of 3H or more as measured according to JIS K5400 standard method.

The optical film of the invention has a low volume shrinkage, does not warp, and possesses excellent anti-static properties and high hardness properties.

17 Claims, 4 Drawing Sheets

SCRATCH-RESISTANT OPTICAL FILM

BACKGROUND OF THE INVENTION

1. Field of the Invention

The present invention relates to a scratch-resistant optical film with a cured coating, and more particularly, to a scratch-resistant reflective film applicable to liquid crystal displays (LCDs).

2. Description of the Prior Art

Since a liquid crystal panel does not emit light itself, a backlight module, as a brightness source, is an important element for the displaying function of LCDs, and is very important for enhancing the brightness of LCDs. Presently, various optical films are used in the backlight module, and the use of such various optical films has become the most economical and convenient solution to enhance the brightness of an LCD panel to optimize the service efficiency of the light source without altering any element design or consuming additional energy. FIG. 1 is a schematic diagram of various optical films contained in a backlight module. As shown in FIG. 1, the optical films contained in a common backlight module include: a reflective film (1) disposed below the light guide plate (2); and other optical films disposed above the light guide plate (2), i.e., from the top to the bottom, a diffusion film (3), brightness enhancement films (4) and (5), and an upper diffusion film (6) in sequence.

An excellent reflective film can improve the brightness, and more importantly, can wholly improve the brightness without reducing the viewing angle. According to actual tests, as the reflectivity is increased by 3-5%, the brightness of the same module will be enhanced by 8-10% under the same conditions.

In recent years, a new technique of using a V-cut light guide plate in backlight modules has been developed. As shown in FIG. 2, the V-cut technique mainly employs one reverse prism sheet (9), and one V-cut light guide plate (8) and one reflective film (7) under the reverse prism sheet, whereas two prism sheets were used in prior backlight modules. Compared with the conventional backlight module, the brightness of the backlight module having a V-cut light guide plate can be enhanced nearly by 30%, and thus the required power can be reduced by one third, which is considerably beneficial to the improvement on power-saving performance.

However, either for the conventional screen printed light guide plate or for the V-cut light guide plate, when it is used together with a reflective film, the optical structure on the reflective film will directly contact the guide plate and thus fine scratches or white spots may occur on the reflective film, which may adversely affect the light uniformity and weaken the mechanical strength of the reflective film.

Moreover, current V-cut light guide plates are normally used together with a silver (Ag) reflective plate. Since an evaporation deposition process is needed, the production rate is slow, the cost is high, and the silver metal is easy to be scratched.

In view of the above, the present invention provides a scratch-resistant optical film to overcome the above-mentioned shortcomings. In the present invention, a novel hard coat solution is used to form a scratch-resistant layer on a surface of a substrate. After curing the hard coat solution, the hardness of the optical film can be improved, so as to avoid scratching the surface structure of the reflective film during operation. The optical film has high transparency and good evenness, and will not warp, thereby achieving the purpose of the present invention.

SUMMARY OF THE INVENTION

The present invention is mainly directed to a scratch-resistant optical film without warp, comprising a reflective substrate and a scratch-resistant layer with anti-static properties coated on at least one surface of the substrate, wherein the scratch-resistant layer has a surface resistivity in the range from $10^8$ to $10^{12} \Omega/\square$, and a pencil hardness of 3H or more as measured according to JIS K5400 standard method.

DETAILED DESCRIPTION OF THE INVENTION

Figure 1:
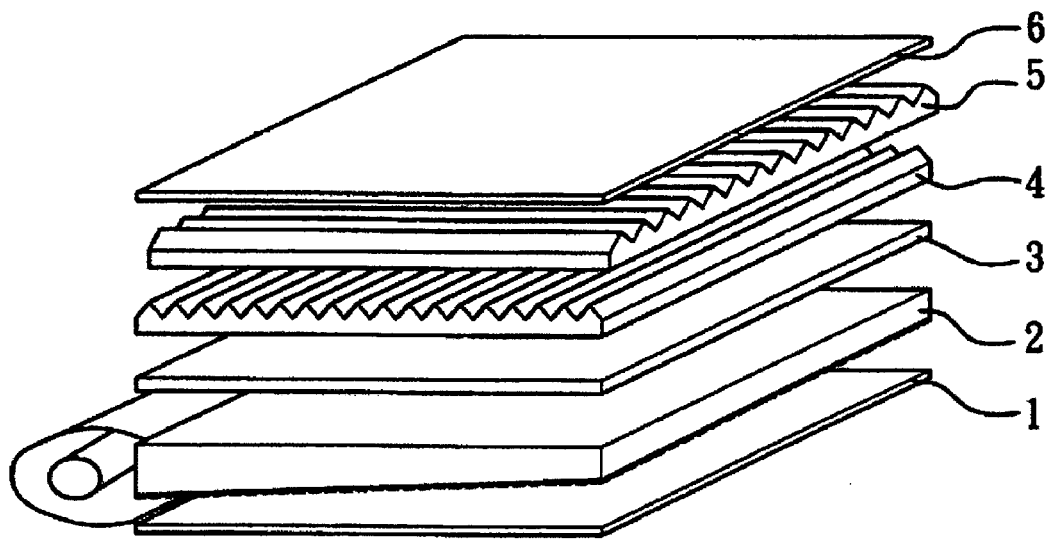
FIG. 1 is a schematic diagram of the various optical films contained in a backlight module.
Figure 2:
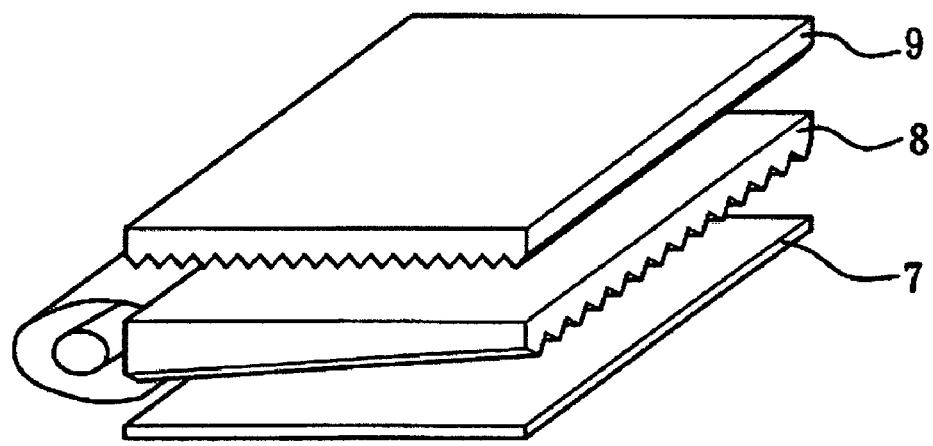
FIG. 2 is a schematic diagram of a V-cut backlight module.

The reflective substrate according to the subject invention can be any kind of substrate known to those having ordinary skill in the art, such as glass or plastic. The plastic substrate is not particularly limited and includes, for example, but is not limited to, polyester resins, such as polyethylene terephthalate (PET) or polyethylene naphthalate (PEN); polyacrylate resins, such as polymethyl methacrylate (PMMA); polyimide resins; polyolefin resin, such as polyethylene (PE) or polypropylene (PP); polycycloolefin resins; polycarbonate resins; polyurethane resins; triacetate cellulose (TAC); or a mixture thereof. The preferred substrates are those formed from polyethylene terephthalate, polymethyl methacrylate, polycycloolefin resin, or triacetate cellulose, or a mixture thereof. More preferably, the substrate is polyethylene terephthalate. The thickness of the substrate preferably is in the range from 16 μm to 1000 μm, usually depending on the desired purpose of an optical product.

The reflective substrate of the present invention can be a monolayer or multilayer structure, wherein one or more layers may optionally be a foamed plastic, a plastic containing particles, or a combination thereof. The reflection effect of the optical film of the present invention can be achieved by using the foamed plastic or the particles. The species of the particles are well known to those skilled in the art, including organic particles and inorganic particles. The organic particles can be, for example, (meth)acrylic resin, urethane resin, or silicone resin particles, or mixtures thereof. The inorganic particles can be, for example, zinc oxide, silica, titanium dioxide, alumina, calcium sulfate, barium sulfate, or calcium carbonate particles, or mixtures thereof. The diameter of the particles or bubbles is in a range from 0.01 μm to 10 μm, preferably from 0.1 μm to 5 μm.

The reflective substrate of the present invention can be composed of one or more commercially available films. The commercially available films applicable to the present invention include, for example, but are not limited to, the films under the trade names uxz1-188®, uxz1-225®, ux-150®, ux-188® and ux-225®, produced by Teijin-Dupont Company; the films under the trade names E60L®, QG08®, QG21®, QX08® and E6SL®, produced by Toray Company; the films under the trade names WS220E® and WS180E®, produced by Mitsui Company; the film under the trade name RF230®, produced by Tsujiden Company; and the films under the trade names FEB200®, FEB250®, and FEB300®, produced by Yupo Company.

When a plastic substrate is used, a scratch-resistant layer is formed on a surface of the plastic substrate to enhance the hardness and avoid the scratch of the surface of the substrate. The scratch-resistant layer normally employed in the industry is typically comprised of an UV curing resin, which tends to warp as a result of non-uniform shrinkage and uneven stress caused by a cross-linking reaction, although superficial hardness is increased.

In order to solve the warp problem, in the present invention, a scratch-resistant layer is formed by coating a hard coat solution on a substrate followed by a heat and ultraviolet (UV) dual curing. In addition to an anti-static agent and a UV curing resin, the hard coat solution also includes a thermal setting resin or a thermal plastic resin or a mixture thereof, of which a thermal setting resin is preferred. The obtained scratch-resistant layer has excellent heat resistance and extremely low volume shrinkage due to the high strength and good toughness of the thermal setting resin, thus overcoming the warp problem. Meanwhile, the scratch-resistant layer of the present invention has the properties of good static resistance and high hardness, and has a surface resistivity in the range from $10^8$ to $10^{12}\Omega/\square$ ($\Omega/\square$ represents ohm/square), and a pencil hardness of 3H or more as measured according to JIS K5400 standard method.

The scratch-resistant optical film of the present invention can provide a reflectivity of more than 95%, preferably more than 97% in the visible wavelength range of 400 to 780 μm, so that the brightness of the backlight module can be effectively enhanced.

In order to render the reflected light more uniform, the scratch-resistant optical film of the present invention provides a certain extent of light-diffusing effect. For example, the light-diffusing effect can be achieved by forming micro concave-convex structures on the scratch-resistant layer. The micro concave-convex structures can be formed by any conventional method, which can be, for example, but is not limited to, screen printing, spray coating, or embossing processing, or coating a particles-containing scratch-resistant layer onto a substrate surface. The thickness of the scratch-resistant layer is in a range from 1 to 20 μm, preferably from 3 to 10 μm. According to an embodiment of the present invention, a hard coat solution containing organic particles is coated on a substrate to form a scratch-resistant layer, so as to provide the scratch-resistant layer with concave-convex structures. The shape of the organic particles is not particularly limited, and can be, for example, spherical, oval, or diamond-shaped. The species of the particles are also not particularly limited, which may be, for example, (meth)acrylate resin, urethane resin, or silicone resin, or a mixture thereof, among which the silicone resin is preferred. The above-mentioned particles may be the same or different in diameter, which is preferably in the range from about 0.1 μm to about 10 μm, more preferably in the range from about 1 μm to about 5 μm, most preferably in the range from about 1.8 μm to about 2.4 μm. The amount of the above-mentioned particles is in the range from 0.1 to 300 wt %, preferably from 5 to 100 wt %, and most preferably from 10 to 30 wt %, based on the total weight of the resin components in the hard coat layer.

FIGS. 3-6 show specific embodiments of the scratch-resistant optical film according to the present invention.

Figure 3:
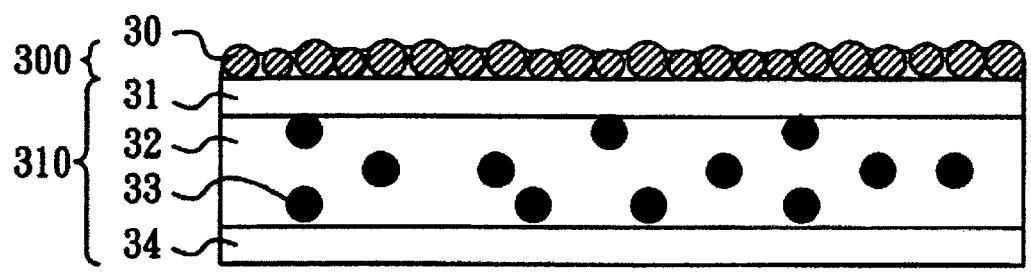
FIGS. 3-6 are the embodiments of the scratch-resistant optical film according to the present invention.

FIG. 3 shows a preferred embodiment of the scratch-resistant optical film of the present invention, in which a scratch-resistant layer (300) with concave-convex structures is coated on a substrate (310). As shown in FIG. 3, the scratch-resistant layer (300) includes organic particles (30); and the substrate (310) is a tri-layered plastic substrate composed of layers (31), (32), and (34), and the intermediate layer (32) contains inorganic particles (33) therein. The species of the substrate can be as those defined herein before. For example, the substrate is PET resin, which can be, for example, the commercially available film under the trade name ux-225®, the intermediate layer of which contains barium sulfate as inorganic particles.

Figure 4:
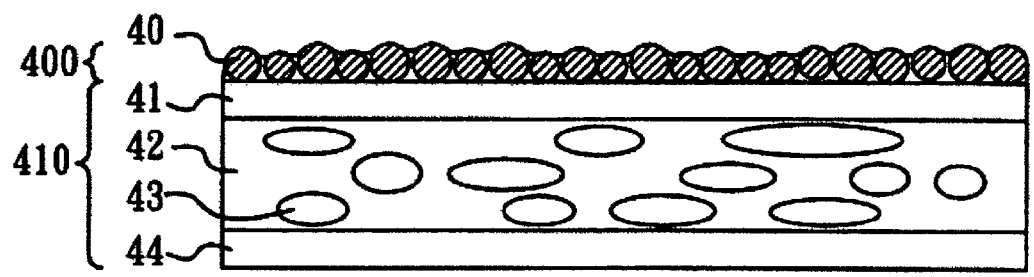

FIG. 4 shows another embodiment of the scratch-resistant optical film of the present invention, in which a scratch-resistant layer (400) with concave-convex structures is coated on a substrate (410). As shown in FIG. 4, the scratch-resistant layer (400) includes organic particles (40); and the substrate (410) is a tri-layered plastic substrate composed of layers (41), (42) and (44), of which the intermediate layer (42) is a foamed plastic with bubbles (43). The species of the substrate can be as those defined herein before. For example, the substrate is PET resin, which can be for example, a commercially available film under the trade name E6SL®, the intermediate layer of which contains bubbles.

Figure 5:
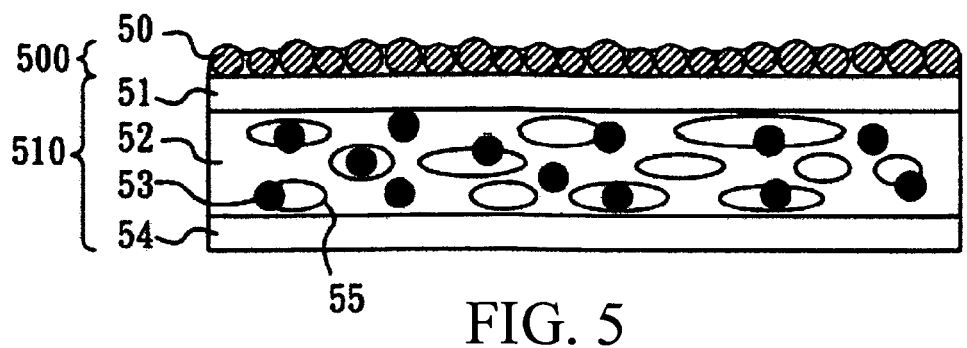

FIG. 5 shows yet another embodiment of the scratch-resistant optical film of the present invention, in which a scratch-resistant layer (500) with concave-convex structures is coated on a substrate (510). As shown in FIG. 5, the scratch-resistant layer (500) includes organic particles (50); and the substrate (510) is a tri-layered plastic substrate composed of layers (51), (52) and (54), of which the intermediate layer (52) contains both inorganic particles (53) and bubbles (55). The species of the substrate can be as those defined herein before. For example, the substrate is PP resin, which can be for example, a commercially available film under the trade name RF230®, the intermediate layer of which contains, in addition to bubbles, titanium dioxide and calcium carbonate as inorganic particles.

Figure 6:
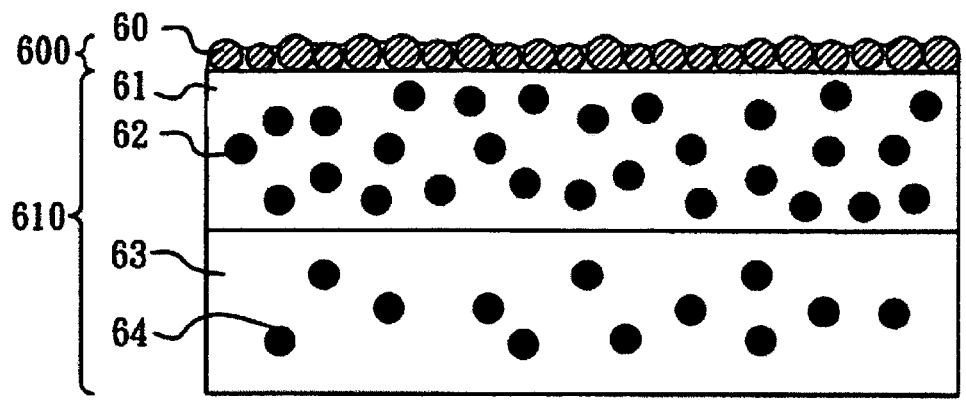

FIG. 6 shows yet one more another embodiment of the scratch-resistant optical film of the present invention, in which a scratch-resistant layer (600) with concave-convex structures is coated on a substrate (610). As shown in FIG. 6, the scratch-resistant layer (600) includes organic particles (60); and the substrate (610) is a bi-layered plastic substrate composed of layers (61) and (63), of which the upper layer (61) contains more inorganic particles (62) and the lower layer (63) contains less inorganic particle (64). The species of the substrate can be those defined as herein before. For example, the substrate is PET resin or PEN resin or a combination thereof. Specific example is a commercially available film under the trade name uxz1-225®, which is composed of a PET resin and a PEN resin and contains barium sulfate as inorganic particles.

Figure 7:
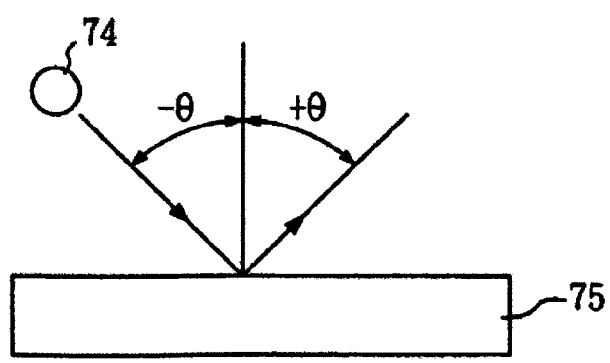
FIG. 7 is a schematic diagram of a gloss test method.

Gloss is a visual impression for evaluating whether a body surface is smooth or not, and if there is more light reflected from the body surface, the expression of the gloss will be more significant. FIG. 7 is a schematic diagram for testing the gloss. As shown in FIG. 7, according to ASTM D523 standard method, the light from a light source (74) is projected on the surface of a sample (75) to be tested at an incidence angle (−θ), and then the surface gloss is measured at a reflection angle (+θ). The surface gloss of the scratch-resistant optical film with concave-convex micro-structures according to the present invention is in a range from 40% to 100%, and preferably from 50% to 96%, according to ASTM D523 standard method with an incidence angle of 60° from a light source.

The UV curing resin applicable to the hard cost solution of the present invention contains at least one acrylate monomer having one or more functional groups. The acrylate monomers useful in the invention include, for example, but are not limited to, (meth)acrylate, urethane acrylate, polyester acrylate, or epoxy acrylate, among which (meth)acrylate is preferred. For example, the acrylates useful in the invention are selected from the group consisting of methyl methacrylate, butyl acrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl (meth)acrylate, isooctyl acrylate, stearyl (meth)acrylate, isodecyl acrylate, isobornyl (meth)acrylate, benzyl acrylate, hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A di(meth)acrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, diethylene glycol dimethacrylate, 2-hydroxyethyl methacrylate phosphate, tris(2-hydroxyethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, di-trimethylolpropane tetraacrylate, propoxylated pentaerythritol tetraacrylate, pentaerythritol tetraacrylate, dipentaerythritol hexaacrylate, methacrylate, hydroxyethyl acrylate, 2-hydroxyethyl methacrylate, tripropylene glycol di(meth)acrylate, 1,4-butanediol di(meth)acrylate, 1,6-hexanediol di(meth)acrylate, allylated cyclohexyl di(meth)acrylate, isocyanurate di(meth)acrylate, ethoxylated trimethylol propane tri(meth)acrylate, propoxylated glycerol tri(meth)acrylate, trimethylol propane tri(meth)acrylate, and tris(acryloxyethyl) isocyanurate, and a mixture thereof.

In order to enhance the film-forming property of the hard coat solution, the UV curing resin of the present invention may optionally comprise an oligomer having a molecular weight in a range from $10^3$ to $10^4$. Such oligomers are well known to those skilled in the art, such as, acrylate oligomers, which include, for example, but are not limited to, urethane acrylates, such as aliphatic urethane acrylates, aliphatic urethane hexaacrylates, and aromatic urethane hexaacrylates; epoxy acrylates, such as bisphenol-A epoxy diacrylate and novolac epoxy acrylate; polyester acrylates, such as polyester diacrylate; or homo-acrylates.

The thermal setting resin applicable to the hard coat solution of the present invention typically has an average molecular weight in a range from $10^4$ to $2\times10^6$, preferably from $2\times10^4$ to $3\times10^5$, and more preferably from $4\times10^4$ to $10^5$. The thermal setting resin of the present invention can be a resin selected from the group consisting of a polyester resin, an epoxy resin, and a polyacrylate resin, and mixtures thereof, and is preferably a polyacrylate resin, such as polymethyl (meth)acrylate. In order to enhance the crosslinking, the thermal setting resin may optionally contain a hydroxyl group (—OH), a carboxy group (—COOH), or an amino group (—NH$_2$), preferably a hydroxyl group, such as hydroxyethyl acrylate (HEA), hydroxypropyl acrylate (HPA), 2-hydroxyethyl methacrylate (HEMA), or hydroxypropyl methacrylate (HPMA), or mixtures thereof.

The thermal plastic resin applicable to the hard coat solution of the present invention is well known to those skilled in the art, which includes for example, but is not limited to, polyacrylate resin, such as PMMA. The thermal plastic resin typically has an average molecular weight in a range from $10^4$ to $2\times10^6$, preferably from $2\times10^4$ to $3\times10^5$, and more preferably from $4\times10^4$ to $10^5$.

During the processing or fabrication of the resin material, static electricity will be generated by the friction of the resin materials themselves or between the resin materials and other materials, which makes the free dusts in the air are aggregated on the surface, resulting in the damage of the expensive electronic devices, and even causing a fire hazard due to the ignition of the combustible gas or powder. Therefore, it is necessary to add an anti-static agent to the resin materials.

The hard coat solution of the present invention is prepared by directly mixing the anti-static agent and the resin followed by mixing processing. The anti-static agents useful in the hard coat solution of the present invention are not particularly limited and are well known to the persons of ordinary skill in the art, which include, for example, ethoxy glycerin fatty acid esters, quaternary amine compounds, aliphatic amine derivatives, epoxy resins (such as polyethylene oxide), siloxane, or other alcohol derivatives, such as poly(ethylene glycol) ester, poly(ethylene glycol) ether and the like.

According to the present invention, the hard coat solution for forming the scratch-resistant layer may optionally contain an additive known to those skilled in the art, which is for example, but not limited to, a curing agent, a photo initiator, a leveling agent, a dispersing agent, or a stabilizing agent.

The curing agent useful in the present invention is well known to the persons of ordinary skill in the art, which allows the cross-linking to be formed by intermolecular chemical bond, and can be, for example, but is not limited to, diisocyanate or polyisocyanate.

The photo initiator used in the present invention will generate free radicals after being irradiated, and initiate a polymerization through delivering the free radicals. The photo initiator applicable to the present invention is not particularly limited, which is for example, but not limited to, benzophenone, benzoin, 2-hydroxy-2-methyl-1-phenyl-propan-1-one, 2,2-dimethoxy-1,2-diphenylethan-1-one, 1-hydroxy cyclohexyl phenyl ketone, or 2,4,6-trimethylbenzoyl diphenyl phosphine oxide, or mixtures thereof. Preferably, the photo initiator is benzophenone or 1-hydroxy cyclohexyl phenyl ketone.

As described herein before, in order to allow the optical film of the present invention to have scratch resistance and have no warp, the hard coat solution according to the present invention is treated by a heat and UV dual curing to form a scratch resistant layer (hereinafter referred to as a first scratch resistant layer) on a substrate surface. However, in order to prevent the optical film of the present invention from being scratched by other films or devices, the lower surface of the substrate of the optical film of the present invention may optionally be coated with another hard coat solution to form a second scratch resistant layer having a thickness in a range from 1 m to 10 μm. According to the present invention, the hard coat solutions used to form the first and the second scratch resistant layers may be the same or different.

The scratch resistant layer of the optical film of the present invention can be made in any way known to the persons of ordinary skill in the art, for example, by utilizing a roll-to-roll continuous process including the following steps:

(I) mixing a UV curing resin, a thermal setting resin, a solvent, and an anti-static agent, and optionally a conventional additive to form a colloidal hard coat solution;

(II) coating the hard coat solution onto a surface of a substrate to form a coating layer;

(III) putting the coated substrate into an oven to evaporate the solvent, and heating the substrate for several minutes at an elevated temperature above the curing point of the thermal setting resin to perform a thermal setting polymerization; and (IV) irradiating the coating with an energetic ray to initiate photo polymerization to form a scratch-resistant layer.

If necessary, the above steps can be repeated to obtain a plurality of scratch-resistant layers.

In the above Step (II), the substrate may optionally be treated with a corona surface treatment or a plasma surface treatment to enhance the adhesion of the hard coat solution. Moreover, the method suitable for coating the hard coat solution on the substrate is well known to those skilled in the art, which can be for example, slit die coating, micro gravure coating, roller coating, or a combination thereof.

In the above Step (IV), the energetic ray refers to a light source in a certain wavelength range, which can be, for example, UV, IR, visible light, or heat ray (radiant heat or radioactive heat), of which UV is preferred. The irradiation intensity can be from 100 to 1000 $mJ/cm^2$, preferably from 200 to 800 $mJ/cm^2$.

Figure 8:
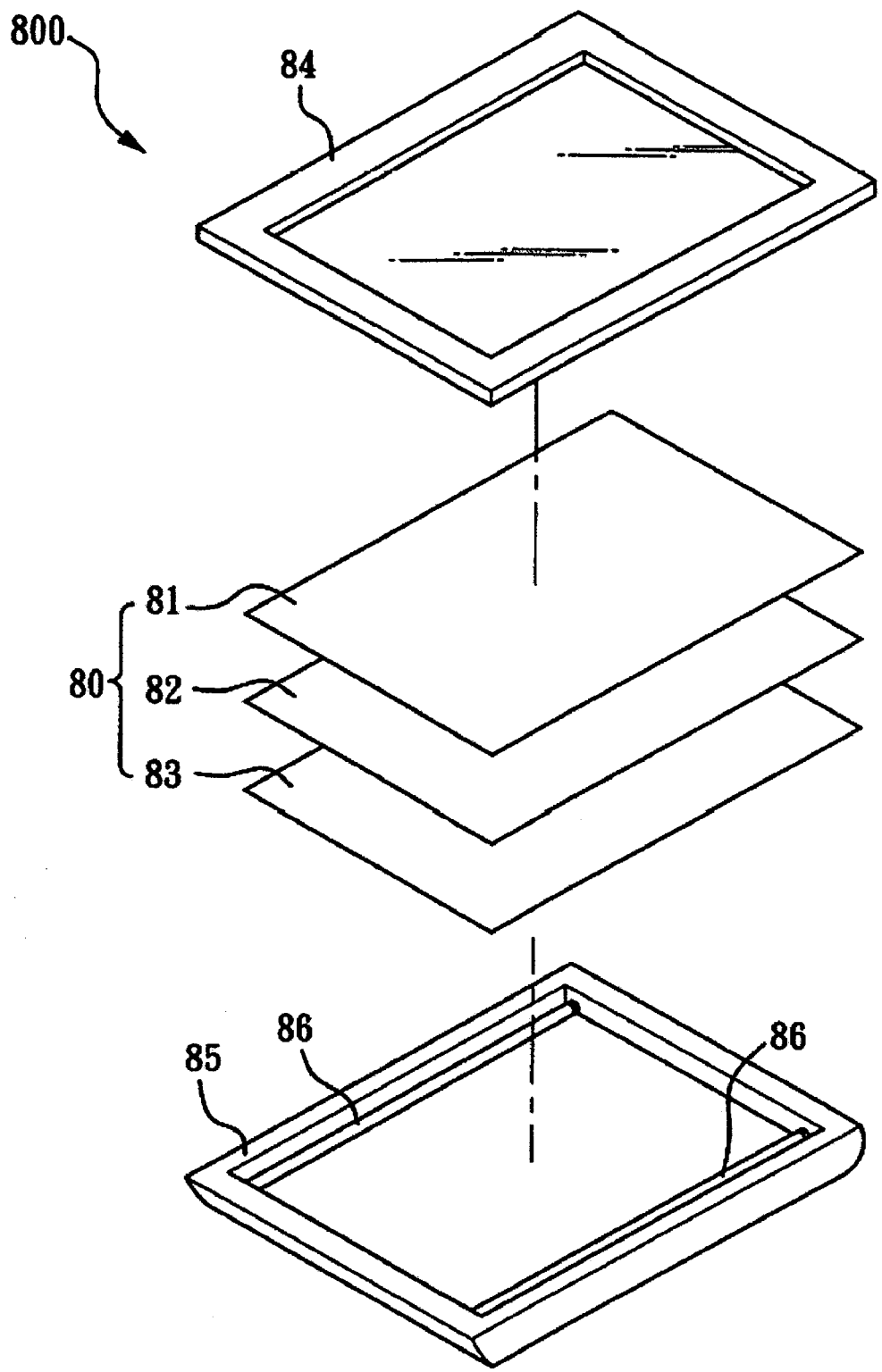
FIG. 8 is a schematic diagram of the light source of an advertising light box.

The optical film of the present invention can be used in light source devices, for example, advertising light boxes and flat panel displays, particularly in LCDs, where the optical film is disposed below the light-emitting surface of an area light source device. The light source device of an advertising light box is as shown in FIG. 8, in which the light source device (800) includes an outer frame (84), an inner frame (85), and a film set (80), wherein a lamp (86) is located in the interior of the inner frame (85), and the film set (80) includes a diffusing film (81), a light guide plate (82), and a reflective film (83). The optical film of the present invention has a scratch-resistant layer formed by coating a novel hard coat solution on a substrate surface, which can effectively improve the hardness and protect the contact means. The surface of the optical film of the present invention is flat without warp, and the optical properties will not be affected. Moreover, the optical film of the present invention provides a reflection effect due to the bubbles or inorganic particles in the substrate, and is useful in a backlight module of a display, particularly a backlight module with a V-cut light guide plate in LCDs, as a scratch-resistant reflective film.

The following examples are used to further illustrate the present invention, but not intended to limit the scope of the present invention. Any modifications or alterations that can easily be accomplished by persons skilled in the art fall within the scope of the disclosure of the specification and the appended claims.

EXAMPLES

Example 1

To a 250 mL glass bottle, the solvent: 16 g of toluene and 13 g of butanone was added. Under high speed stirring, the following UV curing resin: 8 g in total of a monomer mixture of 2-hydroxyethyl methacrylate, methyl methacrylate, butyl acrylate, and pentaerythritol triacrylate; and the following thermal setting resin: 16 g of acrylate resin (Eterac 7363-ts-50, Eternal Company) (with a solids content of about 50%) were added sequentially, and then 1.6 g of a curing agent (Desmodur 3390, Bayer Company) (with a solids content of about 75%), 1.6 g of an anti-static agent (GMB-36M-AS, Marubishi Oil Chem. Co., Ltd) (with a solids content of about 20%), and the following photo initiator: 0.6 g in total of a mixture of benzophenone and 1-hydroxycyclohexyl phenyl ketone were added. Finally, about 57.6 g of a coating with a solids content of about 30% was obtained. The coating was coated on one surface of a reflective sheet (ux-1880, Teijin-Dupont Company) with a RDS Bar Coater #6, dried for 1 minute at 100° C., and then dried by being exposed in a UV exposure machine (Fusion UV, F600V, 600 W/inch, H type lamp source) at a power set at 100% and at a speed of 15 m/min with an energetic ray of 200 $mJ/cm^2$, to afford a scratch-resistant hard coat layer with a coating thickness of about 5 μm. The resultant scratch-resistant optical film had a total film thickness of 193 μm and was tested for various properties. The experimental results are shown in Table 1 below.

Example 2

To a 250 mL glass bottle, the solvent: 16 g of toluene and 13 g of butanone was added. Under high speed stirring, the following UV curing resin: 8 g in total of a monomer mixture of 2-hydroxyethyl methacrylate, methyl methacrylate, butyl acrylate, and pentaerythritol triacrylate; and the following thermal setting resin: 16 g of acrylate resin (Eterac 7363-ts-50, Eternal Company) (with a solids content of about 50%) were added sequentially, and then 1.6 g of a curing agent (Desmodur 3390, Bayer Company) (with a solids content of about 75%), 1.6 g of an anti-static agent (GMB-36M-AS, Marubishi Oil Chem. Co., Ltd) (with a solids content of about 20%), and the following photo initiator: 0.6 g in total of a mixture of benzophenone and 1-hydroxycyclohexyl phenyl ketone were added. Finally, about 57.6 g of a coating with a solids content of about 30% was obtained. The coating was coated on one surface of a reflective sheet (ux-225®, Teijin-Dupont Company) with a RDS Bar Coater #6, dried for 1 minute at 100° C., and then dried by being exposed in a UV exposure machine (Fusion UV, F600V, 600 W/inch, H type lamp source) at a power set at 100% and at a speed of 15 m/min with an energetic ray of 200 $mJ/cm^2$, to afford a scratch-resistant hard coat layer with a coating thickness of about 5 μm. The resultant scratch-resistant optical film had a total film thickness of 230 μm and was tested for various properties. The experimental results are shown in Table 1 below.

Example 3

To a 250 mL glass bottle, the solvent: 30 g of toluene and 30 g of butanone was added. Under high speed stirring, 1.36 g of micro particles of silicone resin with an average particle diameter of 2 μm (Tospearl 120E, GE-Toshiba Company); the following UV curing resin: 36 g in total of a monomer mixture of 2-hydroxyethyl methacrylate, methyl methacrylate, butyl acrylate, and pentaerythritol triacrylate; and the following thermal setting resin: 30 g of acrylate resin (Eterac 7363-ts-50, Eternal Company) (with a solids content of about 50%) were added sequentially, and then 3.0 g of a curing agent (Desmodur 3390, Bayer Company) (with a solids content of about 75%), 6.0 g of an anti-static agent (GMB-36M-AS, Marubishi Oil Chem. Co., Ltd) (with a solids content of about 20%), and the following photo initiator: 1.8 g in total of a mixture of benzophenone and 1-hydroxycyclohexyl phenyl ketone were added. Finally, about 138.16 g of a coating with a solids content of about 41.7% was obtained. The coating was coated on one surface of a reflective sheet (ux-188®, Teijin-Dupont Company) with a RDS Bar Coater #10, dried for 1 minute at 100° C., and then dried by being exposed in a UV exposure machine (Fusion UV, F600V, 600 W/inch, H type lamp source) at a power set at 100% and at a speed of 15 m/min with an energetic ray of 200 $mJ/cm^2$, to afford a scratch-resistant, diffusive hard coat layer with a coating thickness of about 6 μm. The resultant scratch-resistant optical film had a total film thickness of 194 μm and was tested for various properties. The experimental results are shown in Table 1 below.

Example 4

To a 250 mL glass bottle, the solvent: 30 g of toluene and 30 g of butanone was added. Under high speed stirring, 1.36 g of micro particles of silicone resin with an average particle diameter of 2 μm (Tospearl 120E, GE-Toshiba Company); the following UV curing resin: 36 g in total of a monomer mixture of 2-hydroxyethyl methacrylate, methyl methacrylate, butyl acrylate, and pentaerythritol triacrylate; and the following thermal setting resin: 30 g of acrylate resin (Eterac 7363-ts-50, Eternal Company) (with a solids content of about 50%) were added sequentially, and then 3.0 g of a curing agent (Desmodur 3390, Bayer Company) (with a solids content of about 75%), 6.0 g of an anti-static agent (GMB-36M-AS, Marubishi Oil Chem. Co., Ltd) (with a solids content of about 20%), and the following photo initiator: 1.8 g in total of a mixture of benzophenone and 1-hydroxycyclohexyl phenyl ketone were added. Finally, about 138.16 g of a coating with a solids content of about 41.7% was obtained. The coating was coated on one surface of a reflective sheet (ux-225®, Teijin-Dupont Company) with a RDS Bar Coater #10, dried for 1 minute at 100° C., and then dried by being exposed in a UV exposure machine (Fusion UV, F600V, 600 W/inch, H type lamp source) at a power set at 100% and at a speed of 15 m/min with an energetic ray of 200 mJ/cm$^2$, to afford a scratch-resistant, diffusive hard coat layer with a coating thickness of about 6 μm. The resultant scratch-resistant optical film had a total film thickness of 231 μm and was tested for various properties. The experimental results are shown in Table 1 below.

Comparative Example 1

The test for various properties was performed on the commercially available reflective film, ux-225® (Teijin-Dupont Company) with a thickness of 225 μm. The experimental results are listed in Table 2 below.

Comparative Example 2

The test for various properties was performed on the commercially available reflective film, E6SL (Toray Company) with a thickness of 250 μm. The experimental results are listed in Table 2 below.

Comparative Example 3

The test for various properties was performed on the commercially available reflective film, RF230® (Tsujiden Company) with a thickness of 230 μm. The experimental results are listed in Table 2 below.

Comparative Example 4

The test for various properties was performed on the commercially available reflective film, uxz1-225® (Teijin-Dupont Company) with a thickness of 225 μm. The experimental results are listed in Table 2 below.

Test Methods

Reflectivity Test: The reflectivity of the samples was measured with an ultraviolet/visible spectrophotometer (UV/Vis spectrophotometer) (Lamda 650, Perkin Elmer Company) at a wavelength range from 200 nm to 800 nm, according to ASTM 903-96 method using integrating spheres.

Gloss Test: The samples were measured for the Gloss 60° value with a gloss meter (VG2000, Nippon Denshoku Company) according to ASTM D523 method.

Pencil Hardness Test: According to JIS K-5400 method, the test samples were tested with a Pencil Hardness Tester [Elcometer 3086, SCRATCH BOY], using Mitsubishi pencil (HB, 1H, 2H, 3H, 4H).

Surface Resistivity Test: The surface resistivity of the samples was measured with a Superinsulation Meter [EASTASIA TOADKK Co., SM8220&SME-8310, 500 V]. The testing conditions were: 23±2° C., 55±5% RH.

Scratch Resistance Test: A Linear Abraser [TABER 5750] was used, and a 3M BEF-III-10T film (20 mm length×20 mm width) was affixed on a 600 g platform (area: 20 mm length× 20 mm width). The test samples were tested for scratch resistance under pressure directly on the prismatic microstructure layer of the film. The scratch resistance test was performed in 10 cycles with a test path of 2 inch and a speed of 10 cycle/min.

Warp Test: The test samples were cut into level films with 100 mm length×100 mm width, placed in an oven at 120° C. for 10 min, and then taken out and left at room temperature. After being cooled down to the room temperature, the films were measured for warping level on the four corners with a gap gauge (recording unit: millimeter (mm), recording manner: for example, 0;0;0;0), and thereby, the test samples were evaluated for heat-resistant and warp-resistant properties.

TABLE 1

|  | Example 1 | Example 2 | Example 3 | Example 4 |
| --- | --- | --- | --- | --- |
| Resistivity (550 nm, %) | 98.2 | 98.5 | 98.1 | 98.5 |
| Gloss (60°) | 95 | 94 | 87 | 84 |
| Pencil Hardness of Scratch-Resistant layer | 3 H | 3 H | 3 H | 3 H |
| Surface Resistivity of Scratch-Resistant Layer, Ω/□ | $2.6 \times 10^{11}$ | $1.8 \times 10^{12}$ | $5.2 \times 10^{11}$ | $4.8 \times 10^{11}$ |
| Scratch Resistant of Scratch-Resistant Layer | No Scratch | No Scratch | No Scratch | No Scratch |
| Warp Test (mm) (120° C., 10 min) | 0.1; 0.1; 0.1; 0.1 | 0; 0; 0; 0 | 0.1; 0.1; 0.1; 0.1 | 0; 0; 0; 0 |

TABLE 2

|  | Comparative Example 1 | Comparative Example 2 | Comparative Example 3 | Comparative Example 4 |
| --- | --- | --- | --- | --- |
| Resistivity (550 2qnm, %) | 98.4 | 97.6 | 98.4 | 98.4 |
| Gloss (60°) | 45 | 26 | 8 | 26 |
| Pencil Hardness of Scratch-Resistant Layer | HB | HB | HB | HB |
| Surface Resistivity of Scratch-Resistant Layer, Ω/□ | $5.4 \times 10^{16}$ | $8.3 \times 10^{16}$ | $6.8 \times 10^{16}$ | $4.6 \times 10^{16}$ |
| Scratch Resistance of Scratch-Resistant Layer | Severe Scratch | Severe Scratch | Severe Scratch | Severe Scratch |
| Warp Test (mm) (120° C., 10 min) | 0; 0; 0; 0 | 0; 0; 0; 0 | Severe warp | 0; 0; 0; 0 |

It can be seen from the results of the Examples and Comparative Examples that, the scratch-resistant optical films according to the invention possess excellent anti-static and high hardness properties, and the surface thereof is level without warp, thereby avoiding the optical properties to be adversely affected.

I claim:

1. A scratch-resistant optical film comprising a reflective substrate, wherein at least one of the surfaces of the substrate has a scratch-resistant layer which possesses anti-static properties, wherein the reflective substrate is a plastic substrate, the scratch-resistant layer has convex-concave structures and is formed by coating a hard coat solution on the substrate followed by a heat and ultraviolet (UV) dual curing, and the scratch-resistant layer has a surface resistivity in the range from $10^8$ to $10^{12}$ $\Omega/\square$, and a pencil hardness of 3H or more as measured according to JIS K5400 standard method;
wherein the substrate is a monolayer or multilayer structure and contains organic particles selected from the group consisting of (meth)acrylate resin, urethane resin, silicone resin, and mixtures thereof, and the hard coat solution comprises an anti-static agent, a UV curing resin, and at least one resin selected from the group consisting of a thermal setting resin, a thermal plastic resin, and a mixture thereof.

2. The optical film as claimed in claim 1, wherein the plastic substrate is selected from the group consisting of a polyester resin, a polyacrylate resin, a polyimide resin, a polyolefin resin, a polycycloolefin resin, a polycarbonate resin, triacetate cellulose, and a polyurethane resin, and a mixture thereof.

3. The optical film as claimed in claim 1, wherein one or more layers of the substrate comprise both bubbles and particles.

4. The optical film as claimed in claim 1, having a gloss in a range from 40% to 100% as measured according to ASTM D523 standard method at an incidence angle of 60 from a light source.

5. The optical film as claimed in claim 4, having a gloss in a range from 50% to 96% as measured according to ASTM D523 standard method at an incidence angle of 60 from a light source.

6. The optical film as claimed in claim 1, wherein the hard coat solution further comprises organic particles, and the amount of the organic particles is in the range from 0.1 to 300 wt % based on the total weight of the resin components in the hard coat solution.

7. The optical film as claimed in claim 6, wherein the organic particles are selected from the group consisting of (meth)acrylate resin, urethane resin, silicone resin, and mixtures thereof.

8. The optical film as claimed in claim 6, wherein the organic particles have a diameter in a range from 0.1 μm to 10 μm.

9. The optical film as claimed in claim 8, wherein the diameter of the organic particles is in the range from 1.8 μm to 2.4 μm.

10. The scratch-resistant optical film as claimed in claim 1, wherein the scratch-resistant layer has a thickness in the range from 1 μm to 20 μm.

11. The scratch-resistant optical film as claimed in claim 10, wherein the thickness of the scratch-resistant layer is in the range from 3 μm to 10 μm.

12. The optical film as claimed in claim 1, wherein the anti-static agent is selected from ethoxy glycerin fatty acid esters, quaternary amine compounds, aliphatic amine derivatives, epoxy resins, siloxane, or alcohol derivatives.

13. The optical film as claimed in claim 1, wherein the UV curing resin comprises at least one acrylate monomer having one or more functional groups.

14. The optical film as claimed in claim 13, wherein the acrylate monomer is (meth)acrylate, urethane acrylate, polyester acrylate, or epoxy acrylate.

15. The optical film as claimed in claim 1, wherein the thermal setting resin is selected from the group consisting of a polyester resin, an epoxy resin, and a polyacrylate resin, and mixtures thereof.

16. A backlight module having the optical film as claimed in claim 1 and a V-cut light guide plate.

17. A light source device, comprising an area light source device and the optical film as claimed in claim 1 which is disposed below the light-emitting surface of the area light source device.

* * * * *